US010755426B2

(12) United States Patent
Jouppi et al.

(10) Patent No.: US 10,755,426 B2
(45) Date of Patent: Aug. 25, 2020

(54) EFFICIENT SCENE DEPTH MAP ENHANCEMENT FOR LOW POWER DEVICES

(71) Applicant: Apple Inc., Cupertino, CA (US)

(72) Inventors: Mark Norman Lester Jouppi, Palo Alto, CA (US); Michael Wish Tao, San Jose, CA (US); Eric Bujold, San Jose, CA (US); Stephane Simon Rene Ben Soussan, San Francisco, CA (US); Volker Roelke, Los Altos, CA (US); Geoffrey T. Anneheim, San Francisco, CA (US); Julio Cesar Hernandez Zaragoza, Mountain View, CA (US); Florian Ciurea, San Jose, CA (US)

(73) Assignee: Apple Inc., Cupertino, CA (US)

( * ) Notice: Subject to any disclaimer, the term of this patent is extended or adjusted under 35 U.S.C. 154(b) by 140 days.

(21) Appl. No.: 15/987,834

(22) Filed: May 23, 2018

(65) Prior Publication Data

US 2019/0362511 A1 Nov. 28, 2019

(51) Int. Cl.
*G06T 7/50* (2017.01)
*G01B 11/22* (2006.01)
*G06T 5/00* (2006.01)

(52) U.S. Cl.
CPC ............... *G06T 7/50* (2017.01); *G01B 11/22* (2013.01); *G06T 5/005* (2013.01); *G06T 2207/10024* (2013.01); *G06T 2207/10028* (2013.01)

(58) Field of Classification Search
CPC ........... G06T 7/50–596; G06T 5/00–50; G06T 2207/10024; G06T 2207/10028; G01B 11/22
See application file for complete search history.

(56) References Cited

U.S. PATENT DOCUMENTS

| 8,443,031    | B1 * | 5/2013 | Rao ........................ G06F 17/16 |
|              |      |        | 708/520                                  |
| 9,582,888    | B2   | 2/2017 | Ramachandra et al.                       |
| 9,633,441    | B2   | 4/2017 | Pang et al.                              |
| 2010/0046837 | A1   | 2/2010 | Boughorbel                               |
| 2010/0208994 | A1   | 8/2010 | Yao et al.                               |
| 2012/0120192 | A1   | 5/2012 | Alregib et al.                           |
| 2012/0195492 | A1 * | 8/2012 | Ali ........................ G06T 3/4007 |
|              |      |        | 382/154                                  |
| 2014/0146139 | A1 * | 5/2014 | Schwartz ............. H04N 13/122       |
|              |      |        | 348/43                                   |
| 2014/0198977 | A1   | 7/2014 | Narasimha et al.                         |

(Continued)

FOREIGN PATENT DOCUMENTS

WO WO-2016176840 A1 * 11/2016 ........... G06K 9/4604

*Primary Examiner* — Casey L Kretzer
(74) *Attorney, Agent, or Firm* — Robert C. Kowert; Kowert, Hood, Munyon, Rankin & Goetzel, P.C.

(57) ABSTRACT

An electronic device comprises circuitry implementing a depth map enhancer. The depth map enhancer obtains an initial depth map corresponding to a scene and an image of the scene. The depth map enhancer generates a refined depth map corresponding to the scene using an optimizer, the initial depth map and the image. The refined depth map includes estimated depth indicators corresponding to at least a first depth-information region, identified based at least in part on a first criterion, of the initial depth map. Input based on the refined depth map is provided to an image processing application.

20 Claims, 11 Drawing Sheets

(56) References Cited

U.S. PATENT DOCUMENTS

| | | |
|---|---|---|
| 2014/0267610 A1 | 9/2014 | Ahmad et al. |
| 2014/0313188 A1 | 10/2014 | Cohen et al. |
| 2016/0191905 A1 | 6/2016 | Robinson et al. |
| 2017/0061701 A1 | 3/2017 | Mittal et al. |
| 2017/0124717 A1* | 5/2017 | Baruch .................. G06T 7/187 |
| 2018/0061068 A1* | 3/2018 | Jiao ........................... G06T 5/50 |

* cited by examiner

```
┌─────────────────────────────────────────────────────────────────┐
│ As part of optimizer initialization phase, obtain W, A and B    │
│ matrices (corresponding to linear optimization problem          │
│ formulation WAx = WB) and initial depth values x    1001        │
└─────────────────────────────────────────────────────────────────┘
                                │
                                ▼
┌─────────────────────────────────────────────────────────────────┐
│ To enable Cholesky decomposition to be performed, which         │
│ requires the "A" matrix to be square, modify formulation to     │
│ [WA]ᵀ[WA]x = WB    1004                                         │
└─────────────────────────────────────────────────────────────────┘
                                │
                                ▼
┌─────────────────────────────────────────────────────────────────┐
│ To avoid expensive large-size matrix multiplications,           │
│ pre-compute elements of A' ([WA]ᵀ[WA]) and B' (WB), without     │
│ performing full matrix multiplication    1007                   │
└─────────────────────────────────────────────────────────────────┘
                                │
                                ▼
┌─────────────────────────────────────────────────────────────────┐
│ Use Cholesky decomposition (e.g., in hardware) to solve for     │
│ A'x = B'    1010                                                │
└─────────────────────────────────────────────────────────────────┘
```

*FIG. 10*

EFFICIENT SCENE DEPTH MAP ENHANCEMENT FOR LOW POWER DEVICES

BACKGROUND

Technical Field

This disclosure relates generally to electronic devices comprising, or configured to use, depth sensors, cameras and the like to generate and process images and/or videos.

Description of the Related Art

Digital still and/or video cameras are often incorporated in a number of electronic devices, including mobile phones, wearable devices, tablet computers, laptop computers, desktop computers, security management devices, control components of vehicles and the like. For some types of image processing applications, obtaining accurate scene depth information pertaining to different regions of an image or video frame may be important—e.g., the depth information may be used to identify objects or entities for security/safety reasons, to generate enhanced photographs in selected camera modes using a mobile phone, and so on. The depth information pertaining to a given scene may often be obtained with the help of infrared sensors and the like; for example, raw output of hardware depth sensors may be processed using low-level software or firmware to generate an initial depth map. A variety of depth sensing techniques may be used, including for example active stereo sensing, passive stereo sensing, auto-focus-based techniques, time-of-flight techniques and the like. Unfortunately, depending on aspects of the particular scene being captured, in some cases the initial depth information generated with the help of the sensors may be incomplete or inaccurate—e.g., the presence of a bright light source such as the sun may impact the accuracy of the depth information for some portions of the scene. As a result, the quality of the initial depth map may not be sufficient for at least some image processing applications.

SUMMARY OF EMBODIMENTS

According to some embodiments, a system may comprise a scene depth sensor, an image generator, and a depth map enhancer. The depth map enhancer may obtain an initial depth map corresponding to a scene of which a color image is produced by the image generator. The initial depth map may be based at least in part on output produced by the scene depth sensor. The depth map enhancer may determine, based at least in part on the color image and the initial depth map, initialization settings of a linear optimizer. The initialization settings may comprise respective subsets of depth indicators corresponding to a plurality of regions of the color image, including a first depth-information region which satisfies a first criterion, and a second depth-information region. The depth map enhancer may generate, using the linear optimizer, a refined depth map corresponding to the scene. The refined depth map may comprise one or more estimated depth indicators corresponding to at least the second depth-information region. Input based at least in part on the refined depth map may be provided to an image processing application.

According to one embodiment, a method may comprise obtaining, by one or more electronic devices, an image of a scene and an initial depth map corresponding to the scene. The method may include generating a refined depth map corresponding to the scene using an optimizer, the image and the initial depth map. The refined depth map may comprise one or more estimated depth indicators corresponding to at least a first depth-information region, identified based at least in part on a first criterion, in the initial depth map. Input based at least in part on the refined depth map may be provided to an image processing application.

According to some embodiments, an electronic device may comprise circuitry implementing a depth map enhancer. The depth map enhancer may obtain an initial depth map corresponding to a scene, and an image of the scene. The depth map enhancer may generate a refined depth map corresponding to the scene using an optimizer, the initial depth map and the image. The refined depth map may comprise estimated depth indicators corresponding to at least a first depth-information region of the initial depth map. The first depth-information region may be identified based at least in part on a first criterion.

BRIEF DESCRIPTION OF THE DRAWINGS

FIG. 10 is a flow diagram illustrating aspects of operations in which elements of an input matrix of an optimizer used for depth map enhancement may be determined without performing a full matrix multiplication, according to at least some embodiments.

Figure 1:
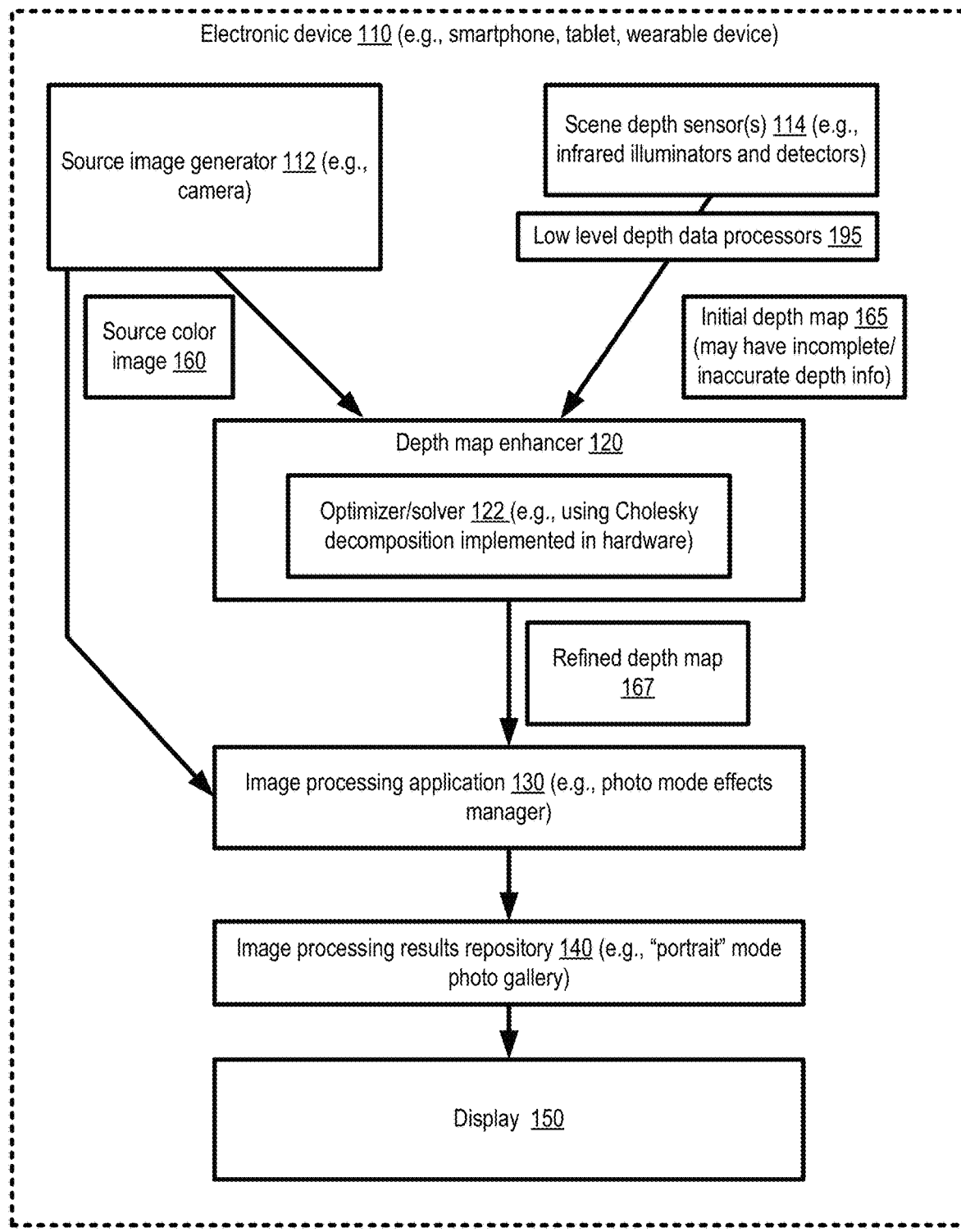
FIG. 1 is a block diagram illustrating an example system comprising an electronic device which includes a depth map enhancer, according to at least some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. Any headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Embodiments of systems and methods for efficiently enhancing scene depth maps are described. According to one embodiment, a system may comprise one or more scene depth sensors, one or more image generators such as cameras, and a depth map enhancer. The scene depth sensor(s), image generator(s) and depth map enhancer may all be incorporated within a single compact device with fairly limited electrical power in some embodiments, such as a cell phone or a wearable device running at least temporarily on batteries. The depth map enhancer may obtain, with the help of the scene depth sensor(s), an initial depth map corresponding to a scene of which a color image is produced by the image generator(s). Note that at least in some embodiments, raw output produced by hardware scene depth sensors may have to be processed, e.g., using low-level firmware, software and/or hardware, to produce the initial depth map. For example, in a structured light system, during such processing, the infrared image from capture time may have its projected dot pattern matched to a reference infrared image captured earlier (at calibration) to generate the initial depth map. In some embodiments, the term "depth sensor" may be used to refer to the combination of the hardware depth sensor and the low-level processing components (if any) that are collectively responsible for generating the initial depth map. Generally speaking, in various embodiments a depth map may indicate the respective depths (approximate distances from the position where the color image was captured) of various portions of the scene (e.g., with respective depth indicators corresponding to individual pixels or groups of pixels of the image). In at least some embodiments, a given depth indicator of a depth map may comprise a single numerical value, and as such the depth indicator may also be referred to simply as a depth value; in other embodiments, more complex data structures may be used as depth indicators.

The initial depth map obtained by the depth map enhancer may comprise incomplete or inaccurate depth indicators for at least some portions of the scene in some cases, e.g., due to the presence of strong light sources, unideal reflective surfaces and the like in the scene, which may impact the quality of the output of the depth sensor. The term "hole" may be used to refer to pixels (or groups of pixels) for which the depth data included in the initial depth map is incomplete, missing or otherwise inadequate in some embodiments. An efficient linear optimizer (such as circuitry implementing a Cholesky decomposition algorithm), whose input is based at least in part on the color image and the initial depth map, may be utilized by the depth map analyzer in various embodiments to generate a refined depth map. In some embodiments, a parallel implementation of the Cholesky decomposition algorithm, optimized for execution on graphics processing units or GPUs, may be used. The refined depth map may include newly-generated depth indicators for at least some portions of the initial depth map, corresponding to one or more regions for which the initial depth map comprises inadequate depth information. Input based at least in part on the refined depth map may be provided to one or more image processing applications in some embodiments, such as image enhancement applications running on the same compact device in which the depth sensor(s), image generator(s) and the depth map enhancer are incorporated. In at least some embodiments, at least a portion of a workflow involved in generating the refined depth map may be implemented in hardware (e.g., using special-purpose chips rather than the main general purpose CPUs of the system), resulting in extremely fast refinement of the depth information at the cost of very little electrical power.

Depending on the scene, the technical advantages achieved with the help of the depth map enhancer in at least some embodiments may include a substantial improvement in depth information accuracy with respect to the initial depth image, which may in turn lead to the production of more accurate and/or more useful results by the image processing application. Thus, for example, with respect to security applications, it may become possible to identify anomalous objects/entities with a higher success rate more quickly if the depth map enhancer is used, which may in turn lead to improvements in overall safety of the environment being protected. Similarly, with respect to different photography modes supported by a cell phone at which a depth map enhancer of the kind described is used, a higher quality of photographs and/or videos may be produced as a result. For applications involving control subsystems of vehicles (such as autonomous or semi-autonomous vehicles), the use of the depth map enhancer may potentially lead to fewer accidents or other mishaps in some embodiments, as more accurate and rapid detection of objects in the vehicle's external environment may be made possible.

Note that in at least some embodiments, as described in greater detail below, the depth map enhancement algorithms described herein may rely on a number of assumptions. For example, it may be assumed in one embodiment that in a local neighborhood, regions of similar color should generally have similar depth, whereas depth discontinuities may be more likely in regions with color discontinuities. Not all of the underlying assumptions may necessarily hold true for all scenes, and the quality of the enhancement achieved may depend at least partly on the extent to which the assumptions hold. As such, in various embodiments the refined depth values maps produced by the algorithms may represent a "best estimate" of the actual depth values, with no guarantee being provided of how close the estimate is to the true or real-world depth values.

According to at least some embodiments, a pipeline or workflow comprising a plurality of phases or stages may be implemented to enhance the initial depth map. In one embodiment, for example, the input image and the initial depth map may be subdivided into regions of several different categories with respect to depth information quality, such as one or more adequate-depth-information regions, one or more background regions, and one or more inadequate-depth-information regions. As suggested by the name, with respect to the initial depth map and the pixels of the input image, an adequate-depth-information region may comprise a group of pixels for which the depth sensor(s) appear to have captured sufficient depth information for the purposes of the targeted image processing application. A background region, which may for example be designated or estimated using a mask generated for a primary subject of the image, may comprise a group of pixels for which a uniform depth indicator (e.g., the maximum permissible depth value) may be selected in some embodiments. Such a primary subject mask may be obtained, for example, using a face detection algorithm, a color propagation algorithm, or some other trained machine learning model such as a neural network-based model in different embodiments. Note that in at least some embodiments, the designation of a region as a background region may represent a best estimate or approximation; some pixels that happen to be designated as part of a background region may in fact be part of the intended primary subject or primary subject or foreground. In various embodiments, the remainder of the pixels, for which adequate depth information was not available in the initial depth map, and which are not designated as part of a background region, may be designated as inadequate-depth-information regions, for which new depth indicators are to be generated using the optimizer. In at least some embodiments, some regions of the initial depth map may already be classified as inadequate-depth-information regions by the depth sensors—e.g., special depth values representing holes may be provided for such regions in the initial depth map by the depth sensors. In various embodiments, the depth map enhancer may use one or more criteria to distinguish various types of regions from one another, such as adequate-depth-information regions versus inadequate-depth-information regions (and/or background regions). The criteria may, for example, include whether a given set of pixels was designated as a hole in the initial depth map, whether the distance of an individual pixel from an edge of an identified object exceeds a threshold, whether the distance of a bright light source from a set of pixels exceeds a threshold, and so on. The presence of a hole, or a particular distance range with respect to a bright light source or an edge, may lead to classification of a region as an inadequate-depth-information region in some embodiments, for example. The specific criteria and algorithms used for distinguishing the regions may vary in different embodiments. In some embodiments, the number of categories of regions identified may exceed the three baseline categories mentioned above (adequate-depth-information, inadequate-depth-information and background)—e.g., multiple categories of regions that do not satisfy a set of quality criteria in respective ways, and may therefore require different types of enhancements or optimization parameters, may be identified. In various embodiments, the term "depth-information regions" may be used to refer to examples of the different categories of regions identified based on the particular combination of one or more depth-related criteria being employed. Regions which meet particular criteria being used in a given embodiment may be referred to as depth-information regions of a first category or as adequate-depth-information regions, for example, while regions which do not meet the particular criteria may be referred to as depth-information regions of a second category or as inadequate-depth-information regions in such an embodiment.

In various embodiments, the workflow of depth map enhancement may include a phase in which initialization settings of a linear optimizer are generated (such as initial settings for one or more matrices of depth indicator values, constraints and weights associated with the depth indicators, and the like). Respective techniques may be used for initializing the settings for the different categories of regions in some embodiments—e.g., the original depth indicators indicated in the initial depth map may be used for adequate-depth-information regions, a constant depth indicator may be used for the background regions, while a combination of local and global depth similarity factors or formulas may be used for initializing the depth settings for inadequate-depth-information regions.

A given input image may comprise a large number of pixels (e.g., millions of pixels) in some embodiments, for individual ones of which depth information may potentially have to be generated. In at least some embodiments, in order to increase efficiency by reducing the dimensionality of the depth map refinement problem, at least some portions or stages of the enhancement workflow may be performed at the granularity of groups of pixels rather than on individual pixels. In such embodiments, from the color image, a plurality of super-pixels may be identified, where an individual super-pixel comprises one or more contiguous pixels that meet a color homogeneity criterion (and/or some other homogeneity criterion), and then depth enhancement may be performed on the super-pixels instead of on individual pixels. Super-pixels may differ from one another in size (number of constituent pixels) and/or shape in some embodiments; note that in some cases, a given super-pixel may comprise just one pixel. An aggregated (e.g., average) depth indicator for a super-pixel may be generated using a pixel-level initial depth map in various embodiments; as such, the inadequate-depth-information regions, the adequate-depth-information regions, and the background regions may each comprise depth indicators for some number of super-pixels in some embodiments. A first refined depth map generated with the help of the optimizer may comprise a respective estimated depth indicator corresponding to individual super-pixels in such embodiments. Before providing the input to the image processing application, the super-pixel-level refined depth map may be converted to a pixel-level refined depth map in various embodiments. In at least some embodiments, a filter (such as a bilateral filter or a guided image filter) may be used to obtain the pixel-level refined depth map from the super-pixel-level refined depth map.

According to one embodiment, a method may comprise obtaining an image of a scene, and an initial depth map corresponding to the scene, by one or more electronic devices. The depth may comprise incomplete depth information for at least a portion of the scene. The method may further comprise generating, using an optimizer, the image and the initial depth map, a first refined depth map corresponding to the scene, such that the first refined depth map comprises one or more estimated depth indicators corresponding to at least a first inadequate-depth-information region identified in the initial depth map. The method may also include providing input based at least in part on the first refined depth map to an image processing application. In at least some embodiments, the method may include determining a set of initialization settings of the optimizer and then invoking or executing the optimizer. The initialization settings may comprise respective subsets of depth indicators corresponding to a plurality of regions identified in the image, including one or more adequate-depth-information regions, one or more background regions, and one or more inadequate-depth-information regions including the first inadequate-depth-information region.

In some embodiments, an objective function of the optimizer used to generate or obtain the refined depth map comprise an output-to-input similarity term representing a first set of constraints, and/or a color-similarity-to-depth-similarity-correlation term representing a second set of constraints. The output-to-input similarity term may also be referred to in some embodiments as a data term, while the color-similarity-to-depth-similarity-correlation term may be referred to in some embodiments as a regularization term. In effect, the data term may help to ensure that with respect to at least some regions, the depth information generated in the refined depth map is not too different from the original depth indicators of the initial depth map in such embodiments, e.g., under the assumption that the initial depth map did contain at least somewhat useful indications of the true depths for the regions identified as inadequate-depth-information regions. The regularization term may help to ensure that, with respect to at least some regions, if two groups of pixels are similar in color (as indicated in the input image), the depth indicators corresponding to the two groups are also at least somewhat similar in the refined depth map in some embodiments. The data term may, for example, include a constraint on a difference between (a) an estimated depth indicator generated for a first group of one or more pixels by the optimizer and (b) a corresponding original depth indicator (included in the initial depth map) for the first group of pixels. The regularization term may, for example, include a constraint on a difference between (a) an estimated depth indicator generated for a first group of one or more pixels by the optimizer and (b) a depth indicator of a second group of one or more pixels, where the first group and the second group meet a color similarity criterion. In various embodiments, the operations performed to generate the refined depth map may include a set of matrix computations. According to one embodiment, the method may include determining an element of a weight matrix associated with the color-similarity-to-depth-similarity-correlation term, based at least in part on a difference in color value between two groups of pixels.

According to various embodiments, locality or proximity within the image may be used to help determine at least some initialization settings of the optimizer used for the generating the refined depth map. For example, determining the initial settings may include generating, based at least in part on a local depth similarity function or formula, a first depth indicator corresponding to a first group of one or more pixels of a first inadequate-depth-information region. The local depth similarity formula in turn may comprise a first term based on a depth of a second group of one or more pixels of an adequate-depth region, such that the second group of pixels lies within a distance threshold of the first group (e.g., at least some pixels of the second group of pixels may be contiguous to one or more pixels of the first group). Color differences may also be taken into account in the local depth similarity function in some embodiments—e.g., a second term of the local depth similarity function may be based at least in part on a difference in a color value between the first and second groups of pixels, such that the similarity in depth is reduced if the color difference is large.

Global depth similarity functions may also or instead be used in some embodiments to determine initialization depth settings for some pixels. For example, determining the initialization settings in such embodiments may comprise generating, based at least in part on a global depth similarity function, a first depth indicator corresponding to a first group of one or more pixels of the first inadequate-depth-information region. The global depth similarity function may comprise a term based on a depth of a second group of pixels of an adequate-depth-information region, where the second group is selected based on color value differences with the first group.

A number of efficiency-enhancing techniques may be used in various embodiments, e.g., to help ensure that the refined depth map is generated quickly enough for the needs of an image processing application which has stringent performance requirements. In one embodiment, in order to enable the use of a fast algorithm such as Cholesky decomposition for the optimization, one or more input matrices or vectors of the optimizer may have to meet a set of requirements. An input matrix of the optimizer may have to be positive semi-definite, and the input matrix may also have to be a square matrix. The positive semi-definite property may be attained by initializing depth indicators using the region-based approach indicated above in some embodiments. In order to ensure that the input matrix is square, in a naïve approach, matrix multiplication (involving obtaining a product of potentially very large matrices) may be required. However, in one embodiment, a shortcut technique may be employed: at least some entries of the input matrix of the optimizer may be computed directly from weight values selected for the optimizer, without performing a complete matrix multiplication. Sparsity of the input matrices may also help to increase the efficiency with which the optimization computations can be performed in various embodiments. In at least some embodiments, special-purpose chips or circuitry may be used to implement the optimizer, instead of, for example, using software running on a general-purpose CPU. In one embodiment, one or more graphics processing units (GPUs) may be used for the optimizer.

According to some embodiments, an electronic device may comprise circuitry implementing a depth map enhancer. The depth map enhancer may obtain an initial depth map corresponding to a scene and an image of the scene. The depth map enhancer may generate, using an optimizer, the initial depth map and the image, a refined depth map corresponding to the scene, where the refined depth map comprises estimated depth indicators corresponding to at least one inadequate-depth-information region of the initial depth map. Input based at least in part on the refined depth map may be provided to an image processing application. In one embodiment, a filter (such as a bilateral filter or a guided image filter) may be applied to the refined depth map to generate the input for the image processing application. The initial depth map may be obtained from a variety of depth sensors in different embodiments, such as sensors comprising infrared devices and/or LIDAR (light detection and ranging) devices.

FIG. 1 is a block diagram illustrating an example system comprising an electronic device which includes a depth map enhancer, according to at least some embodiments. As shown, a system 100 may comprise an electronic device 110 with one or more source image generators 112 (e.g., cameras), one or more scene depth sensors 114, and a depth map enhancer 120 in the depicted embodiment. The source image generator 112 may capture a source color image 160 of a scene, e.g., in response to a control signal (such as pressure applied to a physical or virtual shutter release button) from a user of the electronic device. The scene depth sensors 114, which may for example comprise infrared radiation illuminators and detectors of reflected infrared radiation, may capture depth information pertaining to the scene. In the depicted embodiment, output produced by the scene depth sensors 114 may be used by one or more low-level depth data processors 195 to generate an initial depth map 165, indicating an initial estimate of the depth or distance of various portions of the scene from the electronic device 110. For example, in one embodiment in which infrared hardware sensors are used, as part of the operations performed at the low level depth data processors, the projected dot pattern of an infrared image corresponding to capture time may be matched to a reference infrared image captured earlier. In at least some embodiments, the granularity of the initial depth map may be similar or identical to that of the source color image 160—e.g., if the source color image comprises N pixels, the initial depth map 165 may comprise N depth values or indicators. In other embodiments, the granularities of the source color image 160 and the initial depth map 165 may not be identical.

Figure 2:
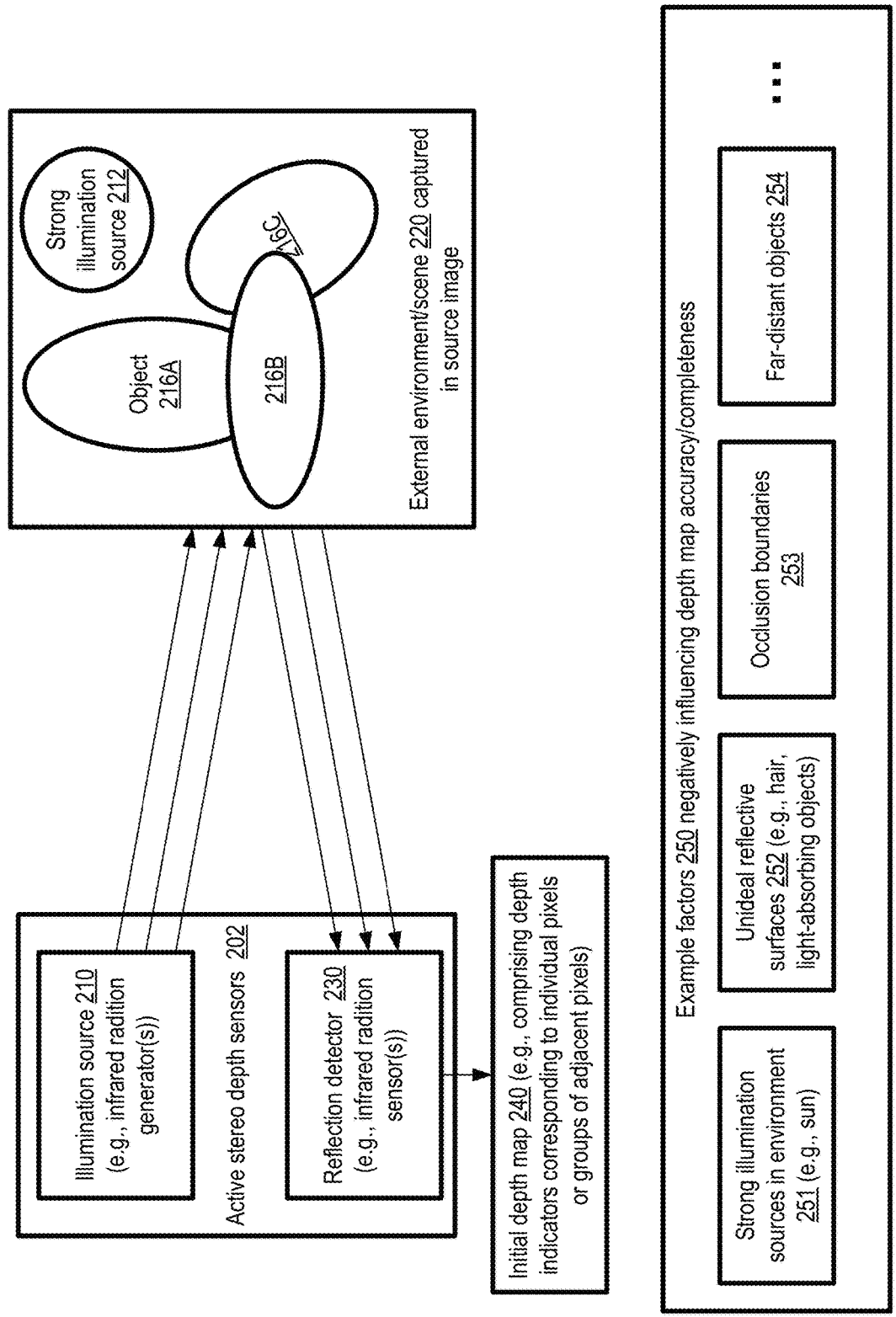
FIG. 2 illustrates example factors which may influence the quality of the depth information generated by a depth sensor, according to at least some embodiments.

For some scenes, in various embodiments, the initial depth map 165 may have incomplete or inaccurate depth information corresponding to at least some parts of the scene captured in the corresponding source color image (examples of factors that may cause this incompleteness/inaccuracy are discussed in further detail below with respect to FIG. 2). In such scenarios, the initial depth map 165 may be refined with the help of the depth map enhancer 120 before depth information pertaining to the captured scene is provided as input to an image processing application 130. If the refinement were not implemented, the results 140 of the image processing application with respect to at least some captured images may not be of a desired quality. A variety of image processing applications 130 may rely on accurate scene depth information in different embodiments, such as photography applications which support "portrait mode" photographs and/or other types of special effects or modes, object identification applications used in security management, vehicle trajectory planning applications, and the like. In some embodiments, while the depth map enhancer 120 may be used for the purposes of still image capture via a camera (e.g., a camera of a smart phone with "portrait mode" enabled), the depth map enhancement techniques may not necessarily be fast enough to be used for live preview.

The depth map enhancer 120 may obtain the source color image 160 and the initial depth map 165 in the depicted embodiment, and analyze them with the help of an optimizer or solver 122 to help generate a refined depth map 167. The refined depth map 167 may rectify at least some of the shortcomings in the initial depth map 165 in various embodiments; e.g., various holes in the initial depth map (regions or pixels for which depth information is incomplete or inaccurate) may be filled with more accurate depth estimates. A workflow or pipeline comprising several different phases may be implemented to improve the depth information in some embodiments, including for example dimensionality reduction, region classification, initialization of settings of the optimizer, execution or invocation of the optimization algorithm, and/or dimensionality restoration. Further details regarding various aspects of the workflow are provided below, e.g., in the context of FIG. 3. Input based at least in part on the refined depth map 167 may be provided to the image processing application 130 in the depicted embodiment, e.g. together with the source color image 160.

The image processing application 130 may have fairly stringent performance requirements in at least some embodiments—e.g., the image processing may have to be completed within K milliseconds of the time that the source color image 160 was produced. The depth map enhancement workflow may accordingly be designed to be extremely efficient in various embodiments. For example, in at least some embodiments, at least a portion of the workflow, including the optimizer may be implemented using specialized hardware (e.g., one or more chips designed for optimized matrix computations or for implementing a specific optimization algorithm). In other embodiments, at least a portion of the workflow may be implemented using software run, for example, on graphical processing units (GPUs). An optimization algorithm that is known to be fast, such as a Cholesky decomposition algorithm, may be used in at least some embodiments, and various shortcut techniques may be implemented during the initialization and execution of the algorithm as discussed below in further detail.

Depending on the nature of the image processing application 130, results of the processing performed with the help of the refined depth map 167 may be stored in a repository 140 in some embodiments (e.g., a photo gallery comprising enhanced images corresponding to "portrait mode" or other modes may be populated with the results of the image processing). In some embodiments, the results may be visualized via display 150 incorporated within the electronic device 110—e.g., a user of a smart phone may be able to view an enhanced version of the source color image 160. In at least one embodiment, other types of results, which may not necessarily be limited to visible artifacts may be generated by the image processing application—e.g., with respect to security monitoring, alerts/alarms may be generated, while with respect to vehicle motion planning, vehicle trajectories may be selected and implemented.

A variety of electronic devices 110 may include a depth map enhancer 120 in different embodiments, such as smart phones, smart cameras, tablet computing devices, laptops/desktops. wearable devices, augmented reality (AR) devices, virtual reality (VR) devices, devices incorporated within control systems of vehicles, security management/monitoring devices, Internet-of-things (TOT) devices and the like. In some embodiments the source image generator 112, the scene depth sensor 114, the depth map enhancer 130 and/or the image processing application 140 need not necessarily be implemented on, or incorporated within, the same electronic device. For example, a source image generator 112 and a scene depth sensor 114 may be part of one electronic device in some embodiments, while the depth map enhancer 130 and the image processing application 140 may be incorporated within a different electronic device.

As mentioned above, the depth information corresponding to a captured image, generated initially by one or more depth sensors, may be incomplete in some cases. FIG. 2 illustrates example factors which may influence the quality of the depth information generated by a depth sensor, according to at least some embodiments. In the depicted embodiment, active stereo depth sensor(s) 202 may comprise one or more illumination sources 210 and reflection detectors 230. In some embodiments, infrared radiation may be used for depth sensing—e.g., the illumination sources 210 may comprise infrared radiation generators, while the reflection detectors 230 may comprise detectors for reflected infrared radiation. Other types of illumination sources and detectors may be used in some embodiments, such as LIDAR devices and the like. In various embodiments, the illumination generated by the sources 210 may be directed towards objects 216 (e.g., 216A, 216B and 216C) in the external environment or scene 220 that is captured in the source image, and the reflections generated by the objects 216 may be used to estimate the depth or distance of various parts of the scene provided in the initial depth map 240. In some cases, as when a photograph is taken of an outdoor scene on a sunny day, or of an indoor scene with a bright light, the external environment captured in the image may itself include one or more strong illumination sources 212.

The initial depth map 240 may, for example comprise respective depth values or indicators (e.g., real numbers representing selected distance units) corresponding to at least a subset of the individual pixels (or groups of pixels) of the source image in some embodiments. Example factors 250 which may negatively influence the quality or completeness of the initial depth map 240 in various embodiments may include, for example, the presence of strong illumination sources 251, unideal reflective surfaces 252 (e.g., human or animal hair, light-absorbing objects), occlusion boundaries 253 where objects happen to be partly covered by other objects, the presence of far-distant objects 254 from which the reflected illumination is harder to detect, and so on. Each of these factors may result in initial depth estimates, for at least some portions of the scene, that are too small or too large relative to the actual or "real-world" depth of the scene portions in various embodiments; as such, the depth sensors 202 may not be able to generate depth estimates of the accuracy required or expected for an image processing application. In some embodiments, the initial depth map 240 may include best-effort values for all parts of the scene, with no specific indication of portions for which the depth data is likely to be inaccurate, and the depth map enhancer may identify at least some inadequate-depth regions of the initial depth map using one or more algorithms. In other embodiments, the depth sensor(s) 202 may themselves provide some indication of holes (pixels or groups of pixels with inadequate/unavailable depth information) in the initial depth map—e.g., negative numbers may be used as an indicator of regions for which the depth sensors were unable to judge depth accurately (in contrast to positive numbers indicating accurately-detected depth or distance). In at least one embodiment, confidence maps corresponding to the initial depth maps may be generated, indicating the estimated accuracy of the initial depth map values—for example, a value in the range 0.0 to 1.0 may be generated corresponding to each depth value in the initial depth map, with 0.0 indicating no confidence in the depth value and 1.0 indicating perfect confidence. If a confidence value exceeds a threshold, in some embodiments the corresponding pixels may be designated as part of an adequate-depth-information region. Note that although active sensing depth sensors 202 are shown by way of example in FIG. 2, in various embodiments the depth map enhancement techniques described herein may be applied with equal success when other types of sensors (or combinations of various types of sensors) are used to generate the initial depth map—e.g., auto-focus sensors, time-of-flight sensors, passive stereo sensors and the like. Of course, the net enhancement achieved may depend, at least in some cases, on how good the initial depth map is, which may in turn depend on the sensor type. In some embodiments, if the initial depth map generated using a particular type of sensor S1 is typically significantly more accurate than the initial depth map generated using a different type of sensor S2, the enhanced depth map obtained by applying the described techniques to S1's initial depth map may also typically be superior to the enhanced depth map obtained by applying the described techniques to S2's initial depth map.

Figure 3:
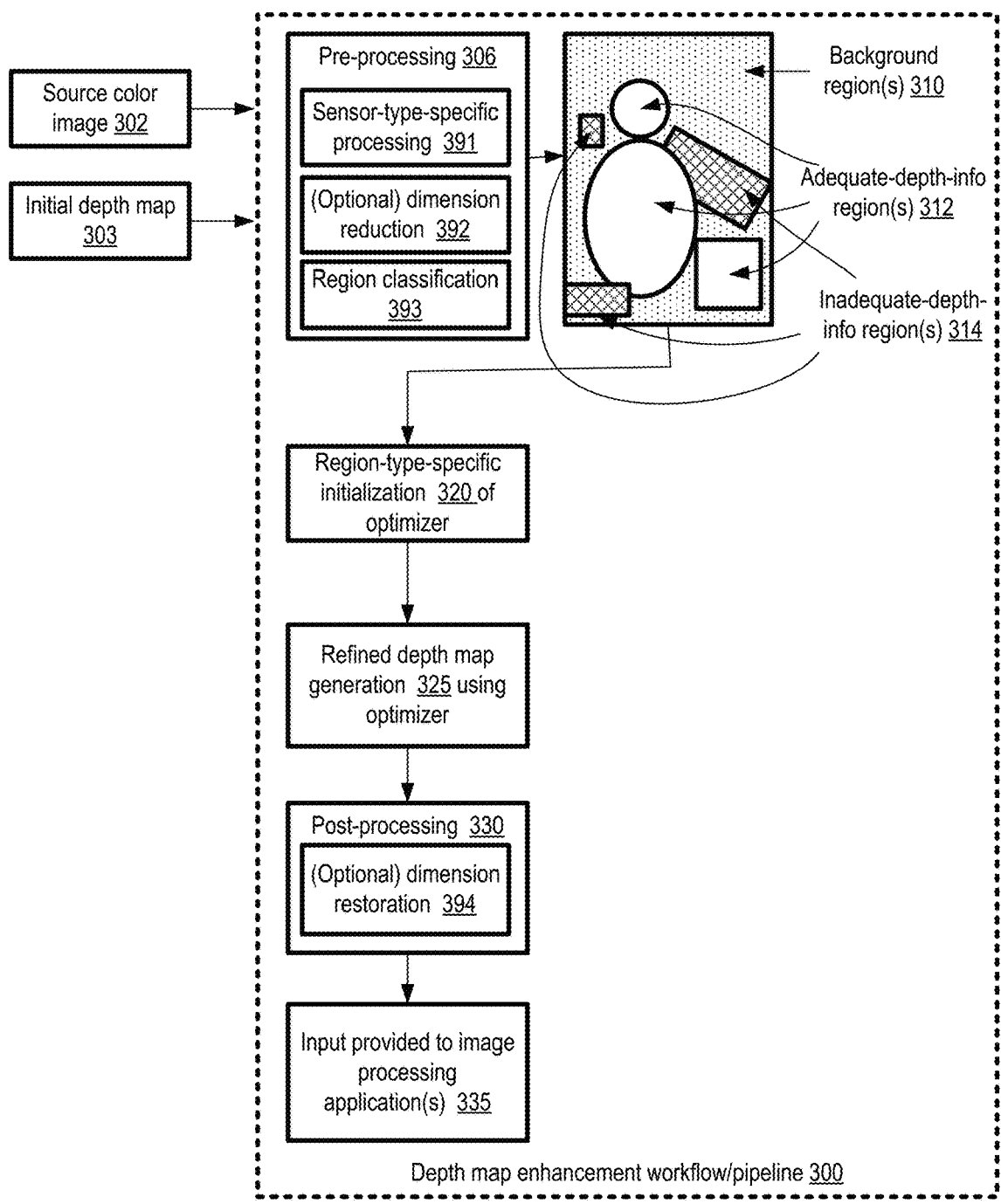
FIG. 3 illustrates an overview of example phases of a workflow which may be used for depth map enhancement, according to at least some embodiments.

FIG. 3 illustrates an overview of example phases of a workflow which may be used for depth map enhancement, according to at least some embodiments. As shown, the workflow or pipeline 300 may begin with a pre-processing phase 306 in the depicted embodiment. During the pre-processing phase 306, in some embodiments, a number of different kinds of operations may be performed. For example, in one embodiment, depending on the specific kind of sensors that were used to generate the initial depth map (such as active stereo sensors, passive stereo sensors, time-of-flight sensors, auto-focus sensors which may for example use phase detection, and the like), gross errors in the initial depth map may be removed in a sensor-type-specific processing stage 391. In at least some embodiments, the dimensionality of at least a portion of the input data (e.g., portions or all of the source color image 302 and/or the initial depth map 303) may optionally be reduced in stage 392, e.g., by identifying super-pixels comprising respective sets of contiguous pixels that meet a homogeneity criterion as discussed below. In various embodiments, at least three types of regions may be identified or estimated within the initial depth map 303 as discussed below in further detail: adequate-depth-information regions 312, background regions 310, and inadequate-depth-information regions 314. In effect, in the region classification phase 393, those portions of the initial depth map which do not already contain accurate depth information (i.e., the inadequate-depth-information regions and/or the background regions) may be distinguished from the portions of the initial depth map which are known or assumed to contain accurate depth indicators. In some cases, a given initial depth map may contain adequate depth information for the entire source image; in at least some embodiments, the depth map enhancement workflow may not be implemented for such initial depth maps.

A region-type-specific initialization phase 320 may follow the pre-processing phase in at least some embodiments. During this phase, depth values to be used for the input of the optimizer with respect to the inadequate-depth-information regions may be generated using a different algorithm than is used for the background regions and/or the adequate-depth regions, elements of one or more optimization-algorithm-dependent weight matrices and/or constraint matrices may be generated for the different regions, and so on, in the depicted embodiment. Details regarding the objective function, in summarized and matrix form, that may be employed for a particular type of optimization algorithm are provided below, e.g., in the context of FIG. 4.

After the optimizer settings are initialized, a refined depth map may be generated by executing/invoking the optimizer in phase 325 in the depicted embodiment. In one embodiment, this phase may for example comprise Cholesky decomposition as discussed below; other types of optimization techniques may be used in other embodiments. In some embodiments, the results generated by the optimizer may be analyzed and/or transformed in a post-processing phase 330 before input 335 is provided to the targeted image processing application(s). For example, in one embodiment in which dimensionality of the inputs was reduced during pre-processing, the original dimensionality may be restored during post-processing, as indicated in element 394. In some embodiments, a different workflow or pipeline may be implemented for enhancing the initial depth map than the workflow shown in FIG. 3.

In at least some embodiments, one or more stages or phases of the workflow 300 may be parallelized. For example, dimensionality reduction and/or restoration may be performed using multiple processors, cores or GPUs in some embodiments, with individual ones of the processing units being used for respective sub-portions of the depth map. Similarly, in at least some embodiments, the settings initialization may be performed in parallel for different parts of the depth map. In at least one embodiment, as discussed below in further detail, entries of some matrices that are part of the input of the optimizer, and may be generated naively using a potentially expensive matrix multiplication operation, may instead be generated or pre-computed without performing the complete matrix multiplication.

Figure 4:
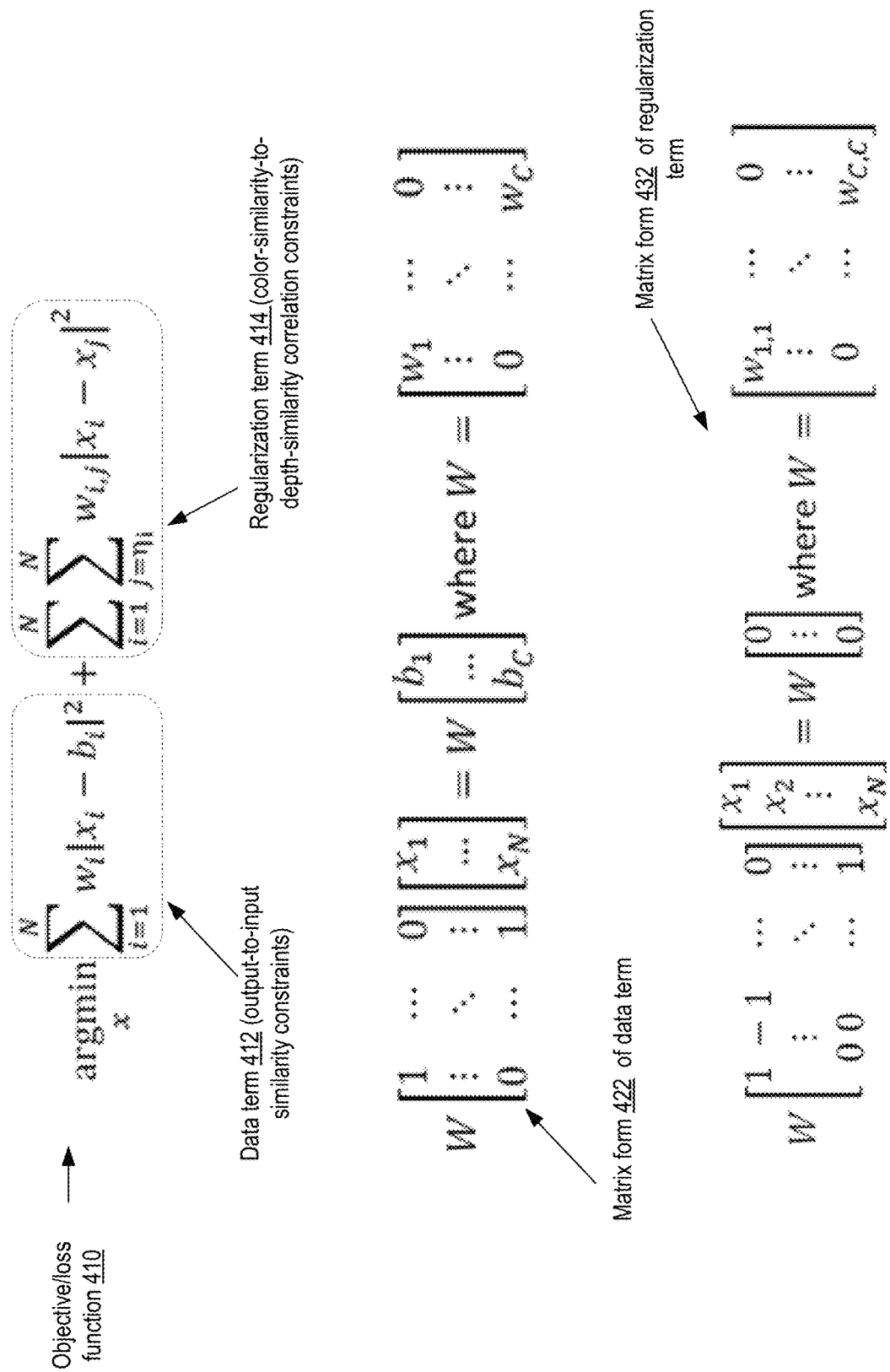
FIG. 4 illustrates aspects of an example objective function of an optimizer which may be used to enhance depth maps, according to at least some embodiments.

FIG. 4 illustrates aspects of an example objective function of an optimizer which may be used to enhance depth maps, according to at least some embodiments. To simplify the discussion, assume that the input color image has N pixels, and that a respective depth value for the scene is to be determined corresponding to each of the N pixels (note that some of the output or determined depth values may be the same as those indicated in the input depth map, while others may have to be estimated based on the constraints expressed in the objective function). In at least some embodiments, at a high level, the optimizer may be designed to solve a linear system of the form WAx=WB, where x is the N×1 matrix of output depth values, with "holes" (representing portions of the input depth map that are inadequate or incomplete) estimated/calculated by the optimizer. If C constraints are imposed on the matrix, W may comprise a diagonal matrix with dimensions C×C in the above linear system, A may comprise a matrix of dimensions C×N, and B may comprise a C×1 matrix.

In the depicted embodiment, for improved efficiency, Cholesky decomposition may be performed to find the optimum depth indicator values for the output or refined depth map (thereby avoiding iterative linear solvers in such embodiments). Portions of the depth map enhancement workflow may focus on making the problem solvable using Cholesky decomposition in some embodiments, which may require A to be a square, positive semi-definite matrix. As shown in FIG. 4, two groups of constraints may be included in the objective or loss function 410 of the optimization: a data term 412 representing output-to-input similarity constraints (also shown in matrix form 422), and a regularization term 414 corresponding to color-similarity-to-depth-similarity-correlation constraints (also shown in matrix form 432). In the notation used in function 410, $\eta_i$ are the immediate neighbors of pixel i. The objective of the optimizer may comprise finding the output depth map ($x_i$ values) which minimize the function 410 in the depicted embodiment. The values of $b_i$ may be set, corresponding to pixels i, to the depth indicators included in the input depth map obtained from the depth sensors in at least some embodiments. As such, the data term 412 may enforce constraints that the output depth solution should bear some similarity to the input depth estimated by the depth sensor (hence the use of the term "output-to-input similarity constraints"), with the extent of the similarity being governed by the weight values $w_i$. The flexibility granted to the optimizer to change the original depth values may be controlled, by increasing or decreasing $w_i$ values, and thereby influencing the penalties incurred in the data term of the loss function.

The regularization term may be translated as constraining the depth values of pairs of output pixels to be similar to each other in the depicted embodiment—e.g., a row with a 1 at column i and a −1 at column j in the A matrix shown in matrix formulation 432 may require the output depth values of pixels i and j to be similar, based on the constraint $w_{i,j}(x_i-x_j)=0$. The importance of the relationship between the output weights of the pair may be adjusted based on the weight value $w_{i,j}$ in various embodiments. In at least some embodiments, the regularization term may be used to constrain the optimizer to favor solutions with similar depths when the color values of the two pixels in the input image are similar (hence the use of the term "color-similarity-to-depth-similarity-correlation constraints"). Such similarity constraints may be important, for example, in making uniformly-colored areas at a particular distance have similar depth values, while still maintaining the flexibility to have depth discontinuities at color image object boundaries in some embodiments. It is noted that in at least some embodiments, instead of generating output depth indicators at the pixel granularity, the analysis may be performed at least initially for groups of contiguous pixels which may be referred to as super-pixels (e.g., with respect to the objective function formulations shown in FIG. 4, N super-pixels may be considered instead of N pixels during at least some phases of the analysis).

Figure 5:
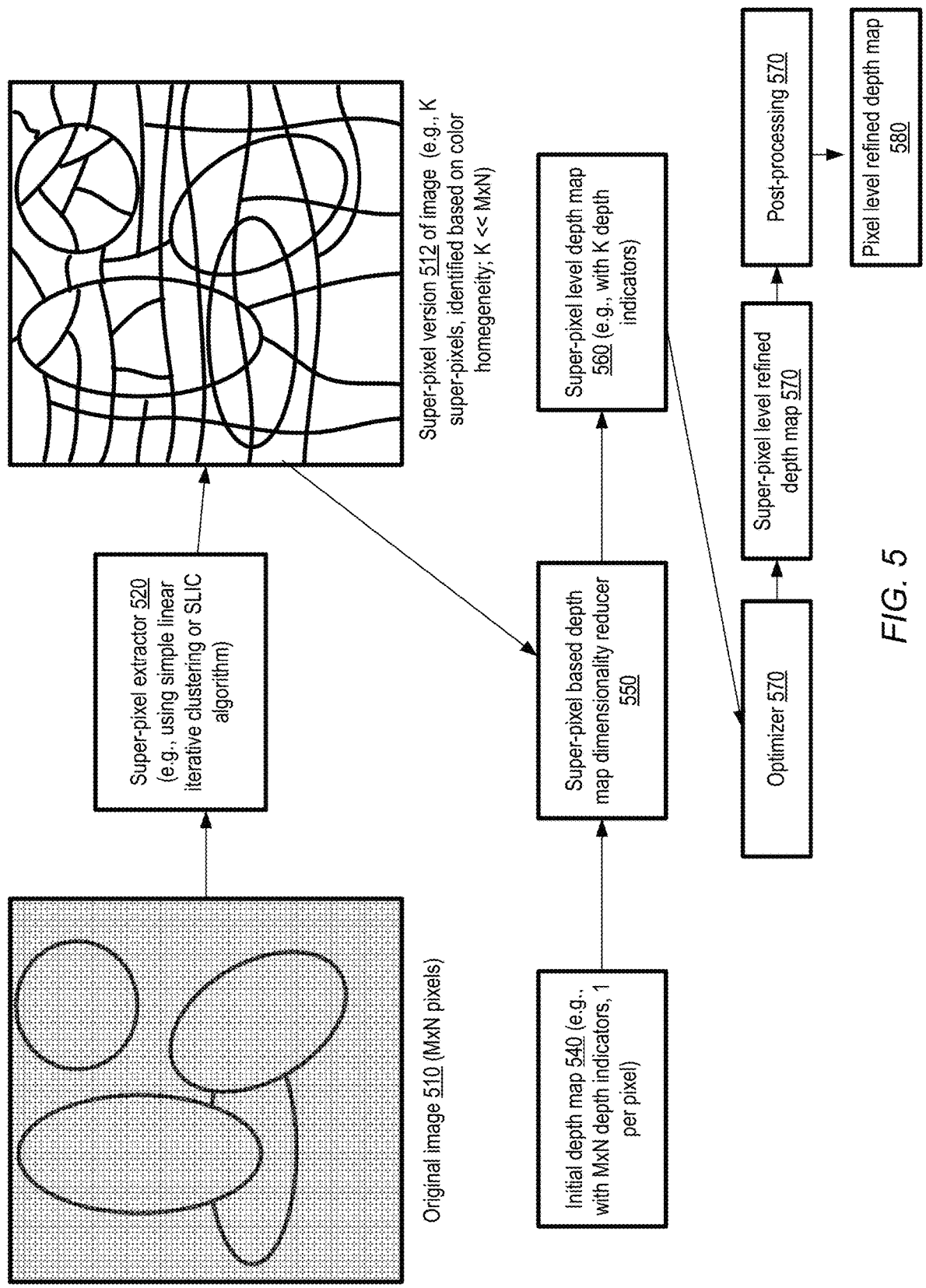
FIG. 5 illustrates an example technique in which depth maps may be enhanced using super-pixel-level analysis, according to at least one embodiment.

FIG. 5 illustrates an example technique in which depth maps may be enhanced using super-pixel-level analysis, according to at least one embodiment. The number of pixels in the color image may simply be too large for the improvements of the depth map to be completed in the short amount of time available for image processing in some embodiments, if the entire analysis were to be performed at a pixel granularity. Such computational constraints may be especially relevant in scenarios in which the enhancements are to be performed on devices with relatively low amounts of electrical power or memory available, such as certain types of phones or wearable devices running on batteries.

In the embodiment depicted in FIG. 5, the original image 510 obtained as part of the input of a depth map enhancer may comprise M×N pixels. A super-pixel extractor 520 may identify a number of super-pixels from the image in some embodiments. In some embodiments, a simple linear iterative clustering or SLIC algorithm may be used to identify the super pixels; other algorithms may be employed in various embodiments. The super-pixel version 512 of the image may comprise K groups of contiguous pixels, such that a given super-pixel comprises one or more pixels which meet a homogeneity criterion in the depicted embodiment. In at least some embodiments, the homogeneity criterion may be expressed in terms of color values of the individual pixels—e.g., contiguous pixels whose color values lie within a threshold value range of one another may be included in a given super-pixel. In other embodiments, other characteristics, such as the total number of pixels being aggregated as a super-pixel, the shape of individual super-pixels, and the like may also be taken into account when identifying super-pixels. Depending on the nature of the image, K may be substantially smaller than M×N in at least some embodiments—e.g., order-of-magnitude reductions in the dimensionality of the input data may be achieved. Note that in various embodiments the number of constituent pixels may differ from one super-pixel to another, and/or the shapes of super-pixels may differ from one another.

The initial depth map 540 may also be generated at the pixel level in some embodiments by the depth sensor(s), and may therefore have a dimensionality of M×N. A super-pixel based depth map 560 may be generated by a depth map dimensionality reducer 550 in at least some embodiments—e.g., by averaging the initial depth values corresponding to the member pixels of the various super-pixels identified in the version 512. In at least one embodiment, if the input depth data for a sufficient number of pixels within a given super-pixel is invalid or incomplete, the depth of the super-pixel may be designated as unknown in the depth map 560. As part of the dimensionality reduction, in some embodiments, statistics about the distributions of the color values and/or depth values in individual super-pixels may be generated and stored. The optimizer 570 may operate on the super-pixel-level depth map 560, e.g., comprising K depth indicators where K<<(M×N), and generate a super-pixel level refined depth map 571 using super-pixel based constraints similar to those described above in the context of FIG. 4 in some embodiments. The reduction in dimensionality may enable the optimizer's computations to be performed much faster than if the original M×N dimensions were retained in at least some embodiments. Working in the super-pixel domain may also have the benefit that noise in the pixel-level input image and depth maps may be reduced or eliminated in some embodiments. Furthermore, in various embodiments, the number of super-pixels K may be kept constant (or near-constant) regardless of the resolution (M×N) of the input image; as a result, the processing required for optimization computations performed at the super-pixel granularity may remain relatively unaffected by the resolution of the input image and initial depth map.

In various embodiments, if the image processing application requires input at the pixel level, the original dimensionality may be re-imposed (e.g., for the depth map and the image) in a post-processing step 572, with a pixel level refined depth map 580 (derived from the super-pixel level refined depth map 571) being provided as input to the image processing application. One or more filters (e.g., bilateral filters and/or guided image filters) may be used during the post-processing phase in one embodiment. In some embodiments, at least some of the image processing operations may also be performed at the super-pixel granularity, so the original dimensionality may not have to be restored. It is noted that while in some of the following description, at least some stages of the depth map enhancement workflow are described as being performed at the super-pixel level, similar analysis may be performed at the individual pixel level in various embodiments; as such, super-pixel-level analysis is not a requirement for the depth map enhancement techniques described herein.

In at least some embodiments, an initial depth estimate for each super-pixel may be needed in order to obtain a positive semi-definite constraint matrix (as may be required for certain types of optimization techniques including Cholesky decomposition). The optimization problem may be formulated as a balance between a data term and a regularization term of the kind described above in the context of FIG. 4 in various embodiments. For the data term, as mentioned earlier, the solution may be constrained in some embodiments to match the initial depth estimates. In one embodiment, a prior may be imposed to help limit the range of possible depth map refinement solutions to those that are most likely. To this end, in at least one embodiment, an estimate of the (likely) primary subject of the image for which the corresponding depth map is to be refined may be leveraged by the depth map enhancer. For example, if the input image is generated with a camera set to "portrait mode", and an individual is identifiable in the image as a probable primary subject of the image, this may be used to guide or constrain various aspects of the refinement of the depth map in some embodiments.

Figure 6:
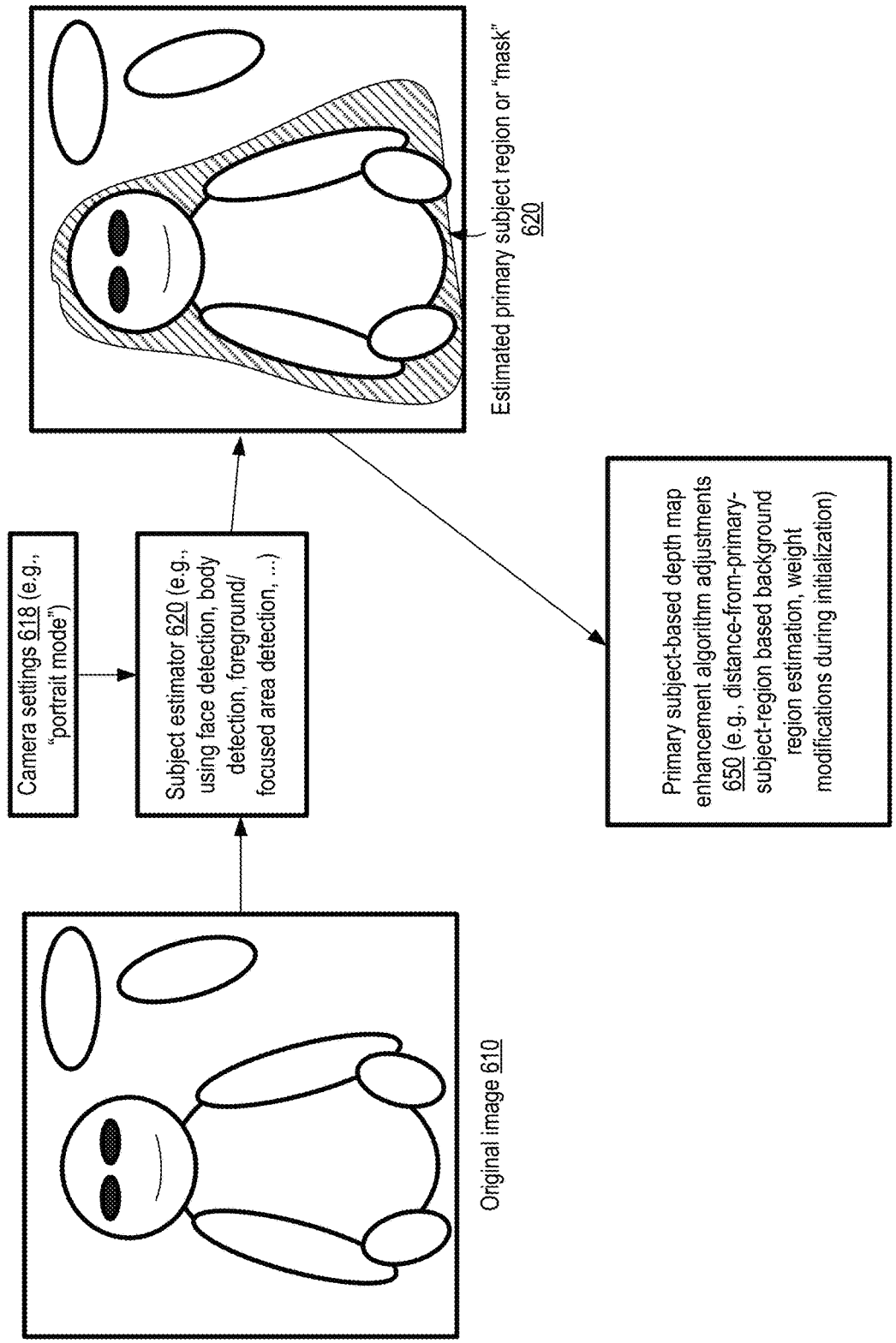
FIG. 6 illustrates an example technique in which a mask representing a primary subject region of an image may be used during one or more phases of depth map enhancement, according to at least some embodiments.

FIG. 6 illustrates an example technique in which a mask representing a primary subject region of an image may be used during one or more phases of depth map enhancement, according to at least some embodiments. In the depicted embodiment, one or more algorithms such as a face detection algorithm, a body detection algorithm, a focus detection algorithm or the like may be employed at a subject estimator 620 to determine a primary subject region or mask 621 corresponding to an original image 610 to be used by a depth map enhancer. In at least some embodiments, input to the subject estimator 620 may include camera settings 618 used for generating the image (such as "portrait mode") or the like, which may also be useful in deducing the primary subject. Machine learning models (e.g., trained neural network models deployed at the electronic device at which the image is generated and/or processed) may be used in some embodiments to estimate or identify the subject—e.g., face detection or body detection may be performed using such models.

The region or mask 621 may be used at one or more stages during the depth map enhancement workflow in different embodiments. For example, in at least one embodiment, one of the tasks to be performed to determine initialization settings for the optimizer may comprise estimating background regions, regions with adequate input depth information, as well as regions with inadequate depth information. In some cases, the depth sensor itself may identify regions for which high-confidence depth information has been captured, and such regions may be designated as adequate-depth-information regions. Similarly, holes or regions with clearly inadequate depth information may also be indicated in the initial depth map in some embodiments. Depending on the type of depth sensor(s) being used, estimating background regions may present a non-trivial challenge in some embodiments—e.g., for some structured infrared sensors, projected infrared dots may not be visible on distant objects, so matching to the reference infrared image may be difficult. In some such embodiments, the distance from the primary subject region (and/or an inadequate-depth-information region or hole) may be used to designate some parts of the image as background regions. In various embodiments, depth values for background region pixels or super-pixels may be set to a constant value, e.g., using a constraint of the form $wx_i = wb_c$, where $b_c$ is the constant. Elements of one or more weight matrices (such as the $w_i$ and/or $w_{ij}$ terms used in the objective function of the optimizer) may also be selected based on whether the corresponding pixels/super-pixels are part of the primary subject region in some embodiments. Other algorithm adjustments 650 may be performed to help the optimizer achieve reasonable values for depth indicators based on assumptions/deductions about the subject matter of the image in various embodiments.

In at least some embodiments, for example because of a requirement for positive semi-definiteness of one or more of the input matrices of the optimizer, depth values may have to be selected for various holes of the initial depth map during the initialization of the optimizer. In one embodiment, local similarity and/or global similarity considerations may be taken into account when selecting such initialization-stage depth values for at least the data term of the objective or loss function. Based on local similarity considerations, in an embodiment in which super-pixel-level analysis is being performed, the initialization stage depth value $d_i$ for a given super-pixel i may be estimated based on the depth values of one or more neighboring super-pixels for which adequate or valid depth information is available in the initial depth map. The initialization-stage depth value $d_i$ for a super-pixel i may be set based at least in part on Local Depth Similarity Formula 1 in such embodiments.

Local Depth Similarity Formula 1 (LDSF1):

$$d_i \sum_{j \in \eta_i} w_j \cdot w_{i,j} \cdot d_j$$

where $$w_j = \begin{cases} 1 & \text{if } d_j \text{ is valid} \\ 0 & \text{if } d_j \text{ is not valid} \end{cases} \text{ and } w_{i,j} = e^{-|p_i - p_j|^2/\sigma^2}$$

In LDSF1, $\eta_i$ are the immediate neighbor super-pixels of super-pixel i, $p_i$ and $p_j$ are the respective color values of the super-pixels i and j in the input image, and $\sigma$ is a tunable parameter. Small $\sigma$ values may lead to sharper edges along color boundaries in various embodiments, while larger $\sigma$ values may lead to smoother results and more bleeding across color boundaries. LDSF1 represents one example formula in which the depth indicators of those super-pixels that lie within a distance threshold may be taken into account, where the distance may be expressed in terms of the number of intermediary super-pixels that have to be traversed to reach super-pixel j from super-pixel i along the shortest path possible (in this approach, the distance is zero for immediate neighbors). In other embodiments, at least some non-immediate neighbors may also be considered when determining $d_i$. In embodiments in which LDSF1 is used, if the difference in color values between super-pixels i and j is high, the weight is low, and vice versa. This may make the depth propagation edge-preserving with respect to image color content in such embodiments.

After local similarity criteria are taken into account, in some cases some holes with uninitialized depth values may remain, e.g., if the holes are very different from their immediate neighbors, as may occur in the presence of point light sources and the like. For such situations, a global similarity approach may be used in some embodiments, in which non-hole super-pixels with the most similar color to a hole super-pixel are identified, and the depth of the hole super-pixel is set to the depth of such most-similar non-hole super-pixel, as per the following Global Depth Similarity Formula 1:

Global Depth Similarity Formula 1 (GDSF1):

$$j^* = \underset{j}{\operatorname{argmin}} \; p_i - p_j$$

$$d_i = d_{j^*}$$

In at least some embodiments, to maintain an edge-preserving regularization term, color similarity may also be used for setting weights $w_{i,j}$, in a manner similar to that used in the local depth similarity formula LDSF1 above:

Regularization Weight Selection Formula 1 (RWSF1):

$$w_{i,j} = e^{-|p_i - p_j|^2/\sigma^2}$$

In embodiments in which RWSF1 is used, the regularization constraint is less powerful (has a lower weight) if the difference in color values is high. Note, however, that such color similarity metrics, while performing well generally, may not work as well within the primary subject matter region of the image some embodiments. Accordingly, in at least some embodiments, the weight may be biased higher (e.g., regardless of color differences) among neighboring super-pixels within the estimated primary subject mask region.

Figure 7:
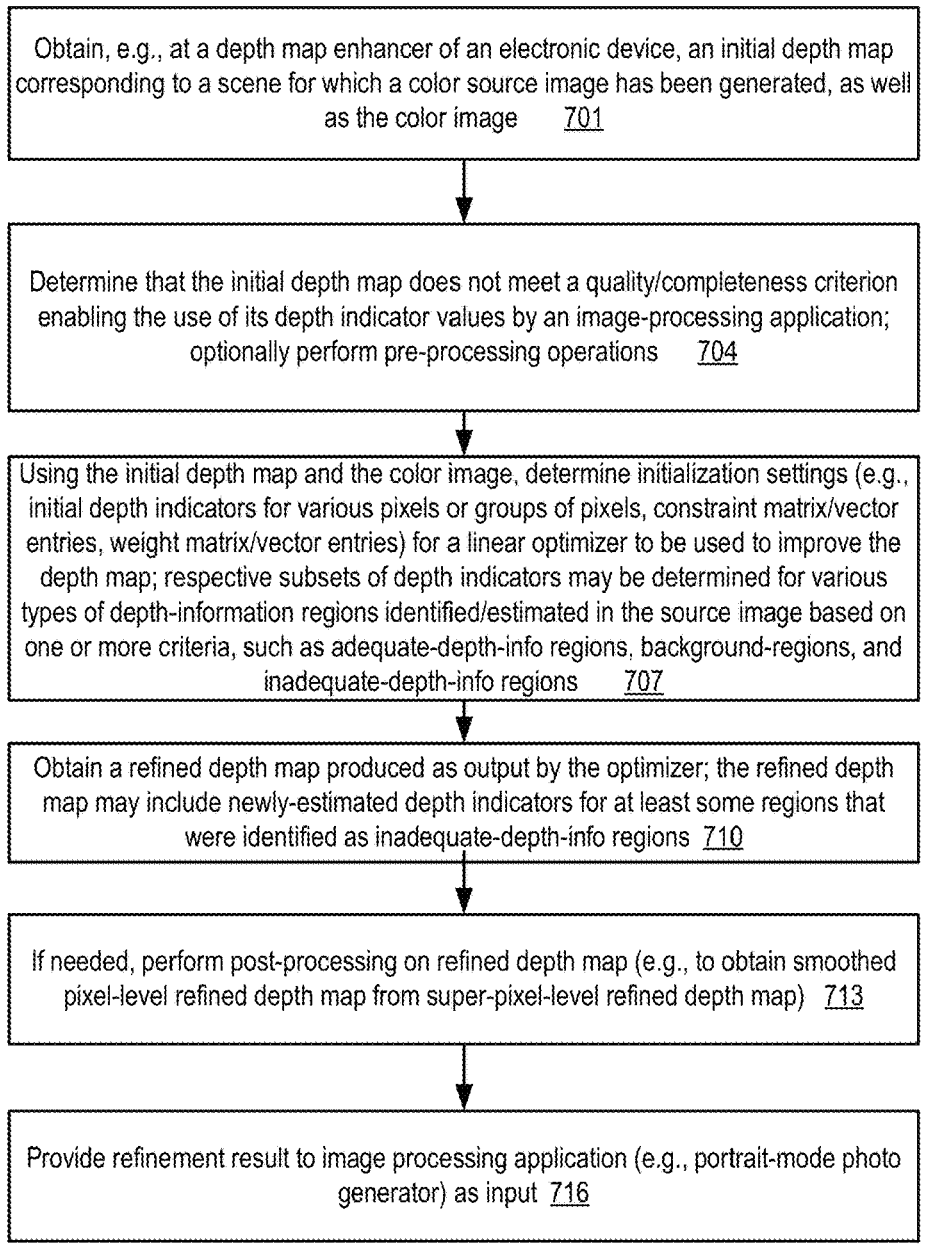
FIG. 7 is a flow diagram illustrating aspects of operations which may be performed to enhance depth maps, according to at least some embodiments.

FIG. 7 is a flow diagram illustrating aspects of operations which may be performed to enhance depth maps, according to at least some embodiments. As shown in element 701, an initial depth map corresponding to a scene for which a color source image is generated may be obtained, e.g., at a depth map enhancer of an electronic device, as well as the color image itself. A determination may be made that the initial depth map does not meet a quality or completeness criterion enabling the effective use of its depth indicator values by an image-processing application in some embodiments (element 704). In at least one embodiment, the depth sensor which generates the initial depth map may itself indicate portions of the map which are incomplete or inadequate (e.g., by including special "invalid depth" values or symbols in the initial depth map). In other embodiments, the depth map enhancer may perform an initial examination of the initial depth map together with the color image and identify regions for which the provided depth indicators appear to be, or are likely to be, inadequate or incomplete. In at least some embodiments, one or more pre-processing operations (e.g., dimensionality reduction by moving from pixel granularity to super-pixel granularity) may optionally be performed on the initial depth map and/or the color image.

Using the initial depth map and the color image, the depth map enhancer may determine initialization settings (e.g., initial depth indicators for various pixels or groups of pixels, constraint matrix/vector entries, weight matrix/vector entries and the like) for a linear optimizer to be used to improve the depth map in at least some embodiments (element 707). Respective subsets of initialization-stage depth indicators may be determined for various types of depth-information regions identified/estimated in the source image, such as adequate-depth-information regions, background-regions, and inadequate-depth-information regions in various embodiments. For example, for those regions for which the initial depth map is deemed to provide correct or valid depth data, the initialization-stage depth settings may simply be copied from the initial depth map, while for regions identified/estimated as background, a constant depth indicator may be selected as the initialization-stage value. For the remaining inadequate-depth regions or holes, considerations such as local and global depth similarity of the kinds discussed earlier may be used to determine the initialization-stage depth indicators in various embodiments. In some embodiments, the optimizer may comprise specialized circuitry to generate at least some of the elements of the refined depth map (e.g., one or more special-purpose chips implementing Cholesky decomposition or a similar optimization algorithm may be used), and general-purpose CPUs of the electronic device at which the depth map enhancer is implemented may not be utilized for the optimization. In other embodiments, CPUs and/or GPUs may be used for at least some parts of the depth map enhancement workflow.

A refined depth map may be generated as output by the optimizer (element 710) in the depicted embodiment. The refined depth map may include newly-estimated depth indicators for at least regions that were identified as inadequate-depth-information regions on the initial depth map in various embodiments. If needed, post-processing operations may be performed on the refined depth map, e.g., to obtain smoothed pixel-level depth values from a super-pixel-level refined depth map in at least some embodiments (element 713). The final result of the refinement (e.g., the refined depth map, or a post-processed version thereof) may be provided as input to an image processing application in the depicted embodiment (element 716). The image processing application may utilize the improved depth data provided for various tasks in different embodiments, e.g., to generate/display enhanced versions of the input color image, to perform security-related analysis, to help plan a trajectory of a vehicle, etc.

Figure 8:
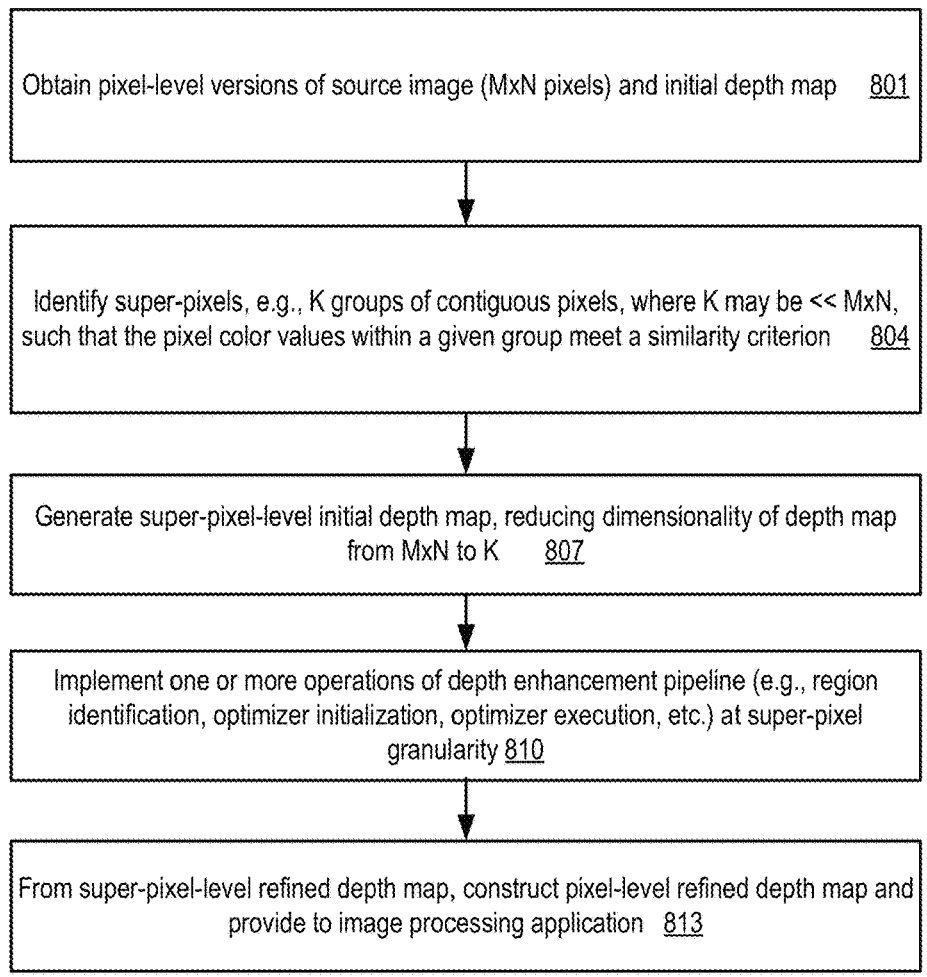
FIG. 8 is a flow diagram illustrating aspects of operations of a technique in which super-pixel level analysis is used to enhance depth maps, according to at least some embodiments.

FIG. 8 is a flow diagram illustrating aspects of operations of a technique in which super-pixel level analysis is used to enhance depth maps, according to at least some embodiments. Pixel-level versions of the source or input color image, as well as the initial depth map may be obtained, e.g., by a depth map enhancer at an electronic device (element 801). The dimensionality of the input image and the corresponding initial depth map may be M×N in the depicted embodiment. From the M×N pixels of the image, K super-pixels or groups of contiguous pixels may be identified (element 804) in various embodiments, such that the color values of the pixels within a given super-pixel meet a similarity criterion with respect to one another. Note that the number of pixels may differ from one super-pixel to another, and the shapes of super-pixels may differ from one another as well in at least some embodiments. Depending on the contents of the image, the number of super-pixels K may be substantially smaller than the number of pixels in the original input image (e.g., K may be one or more orders of magnitude smaller in some cases than M×N).

Based on the identified super-pixels, a super-pixel-level version of the initial depth map may be generated in the depicted embodiment (element 807), reducing the dimensionality of the map from M×N to K. For example, an average of the individual depth values/indicators corresponding to the pixels of a given super-pixel may be computed to obtain the depth indicator for the super-pixel in one embodiment; other aggregation/summarization techniques may be used to determine the super-pixel-level depth data in other embodiments.

One or more operations of the depth enhancement pipeline may be implemented at the super-pixel granularity in some embodiments (element 810). For example, the identification/estimation of regions as background vs. adequate-depth-information vs. inadequate-depth-information, the identification/estimation of the primary-subject region, the initialization settings of the optimizer, and/or the execution of the optimizer may be performed at super-pixel granularity in some embodiments. In various embodiments, from a super-pixel-level refined depth map identified using the optimizer, a pixel-level refined depth map may be constructed (e.g., as part of a post-processing stage of the pipeline or workflow) and provided as input to an image processing application (element 813).

Figure 9:
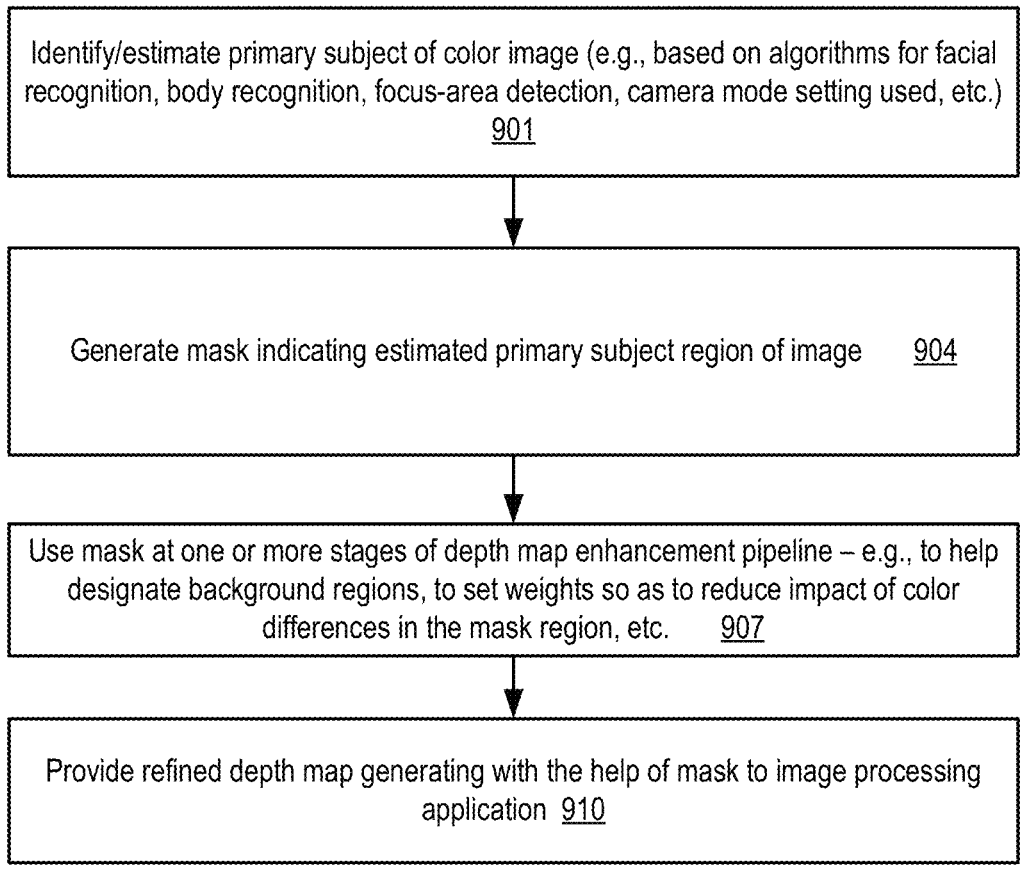
FIG. 9 is a flow diagram illustrating aspects of operations of a technique in which a primary subject mask may be used to help enhance depth maps, according to at least some embodiments.

FIG. 9 is a flow diagram illustrating aspects of operations of a technique in which a primary subject mask may be used to help enhance depth maps, according to at least some embodiments. From the input color image provided to a depth map enhancer of an electronic device, a primary subject region may be identified or estimated in various embodiments (element 901). For example, a mode setting (such as portrait mode) of the camera used to capture the photograph, algorithms for detecting/recognizing faces or bodies may be used, algorithms for detecting in-focus portions of the image, and so on, may be employed to identify the primary subject in some cases. Machine learning models, such as trained neural network based models, may be run to identify the primary subject in at least one embodiment.

A mask indicating the estimated primary subject region may be generated in the depicted embodiment (element 904). The mask may then be used in one or more other stages of the depth map enhancement pipeline (element 907). For example, in some embodiments the mask may be used to help designate regions as background regions and/or as inadequate-depth-information regions. In one embodiment, one or more groups of pixels that are apparently located far from the primary subject mask (based on the initial depth map) may be designated as background regions and assigned a constant depth setting during initialization of the optimizer. Weight values for one or more constraints used during optimization may be set on the basis of the mask in some embodiments—e.g., so as to reduce the potential impact of color differences on depth within the primary subject region. A refined depth map generated with the help of the mask may be provided to an image processing application (element 910) in various embodiments.

FIG. 10 is a flow diagram illustrating aspects of operations in which elements of an input matrix of an optimizer used for depth map enhancement may be determined without performing a full matrix multiplication, according to at least some embodiments. As discussed earlier, the optimization problem to be solved may be expressed using a linear matrix equation of the form WAx=WB in some embodiments. As part of the initialization of the optimizer, values for the elements of matrices W, A and B may be determined, and initial settings for the depth values x may be selected in various embodiments (element 1001).

In order to utilize Cholesky decomposition for determining the refined depth values, the A matrix may be required to be a square matrix as well as a positive semi-definite matrix. By selecting the initial values of x, e.g., in a region-type-dependent way as discussed earlier for adequate-depth-information regions, background regions and inadequate-depth-information regions, the positive semi-definite requirement may be met. However, because of the regularization term, the A matrix may not be square in various embodiments, and transpose operations may be used to modify the linear formulation of the problem into [WA]$^T$[WA]x=WB, thus meeting the square matrix requirement (element 1004). If the product [WA]$^T$[WA] is referred to as A', and WB is referred to as B', the linear problem to be solved may be reformulated as A'x=B'.

Obtaining the product A' may, unfortunately, require substantial computational resources and/or power. As such, if the matrix multiplication were to be completed, more time than desired may be consumed from the perspective of the image processing application in at least some embodiments. Accordingly, a short-cut technique employing the following formulas may be used in some embodiments to compute entries of the product matrix A' and the matrix B' without completing a full matrix multiplication (element 1007):

$$A'(r, c) = \begin{cases} w_i^2 + 2\sum_{j \in \eta_i} w_{i,j}^2 & \text{if } r = c \\ -w_{i,j}^2 & \text{if } r = i, c = j \\ 0 & \text{otherwise} \end{cases} \quad \text{Shortcut formula SF1:}$$

where r and c are rows and columns respectively, $w_i$ is the data term weight and $w_{i,j}$ is the regularization weight. In addition the entries of B' may be obtained as follows:

$$B'(i,1) = w_i^2 d_i \quad \text{Shortcut Formula SF2:}$$

where $w_i$ is the data term weight and $d_i$ is the initialization-stage depth value of the data term. Because of the sparsity of the entries and the easy computation of the entries without a full matrix multiplication, the approach using the shortcut formulas SF1 and SF2 may be extremely efficient and suitable for implementation directly on hardware. In at least some embodiments, accordingly, the solution to the reformulated linear optimization problem A'x=B' may be obtained using Cholesky decomposition implemented in hardware (element 1010).

It is noted that in various embodiments, some of the operations shown in FIG. 7, FIG. 8, FIG. 9 and/or FIG. 10 may be implemented in a different order than that shown in the figure, or may be performed in parallel rather than sequentially. Additionally, some of the operations shown in FIG. 8, FIG. 9 and/or FIG. 10 may not be required in one or more implementations.

Figure 11:
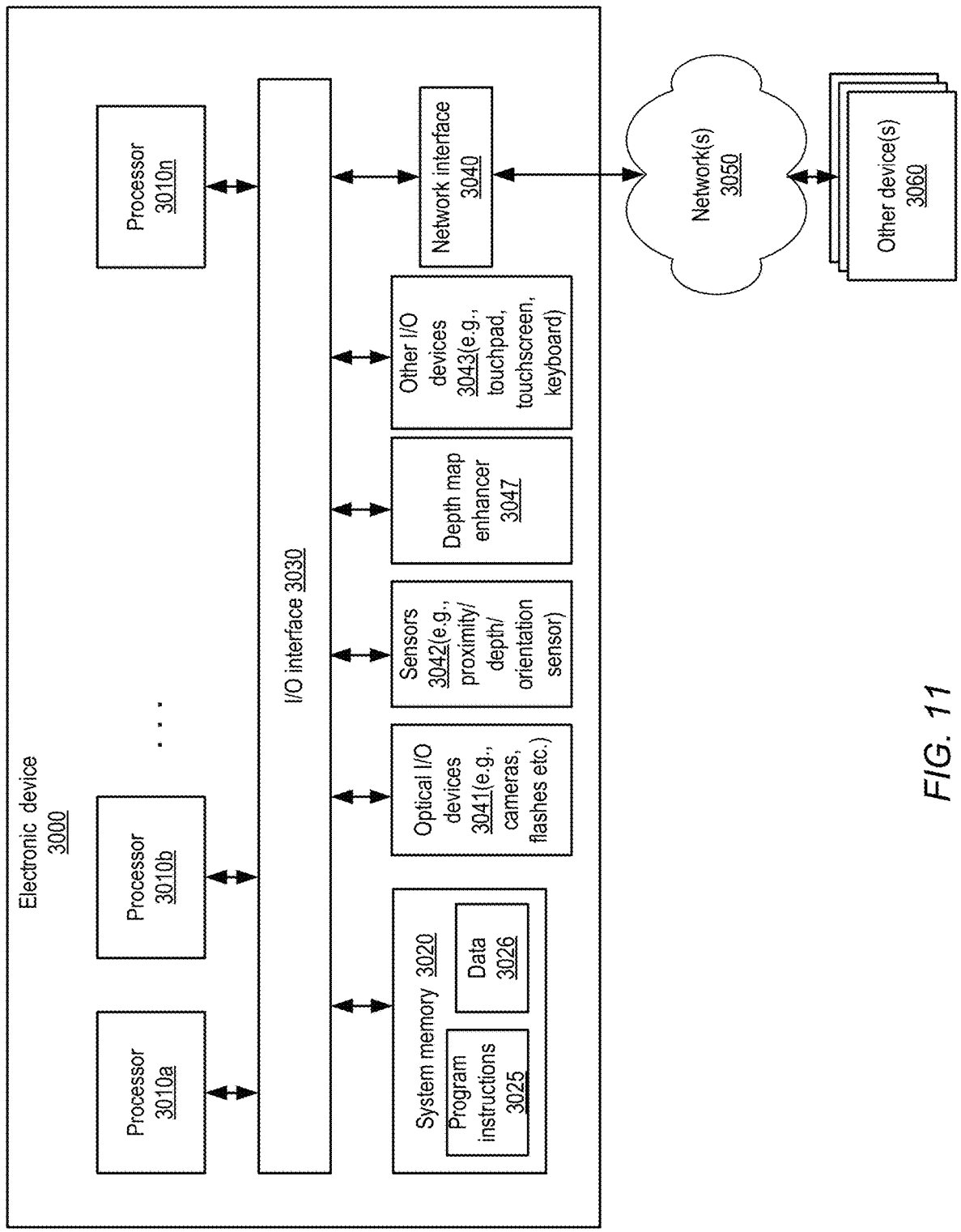
FIG. 11 illustrates components of an example electronic device comprising one or more depth map enhancers, according to at least some embodiments.

As mentioned earlier, a wide variety of electronic devices, such as smart phones, intelligent security cameras, automobile control system components and the like may comprise or make use of depth map enhancers in different embodiments. FIG. 11 illustrates components of an example electronic device comprising one or more depth map enhancers, according to at least some embodiments. It is noted that FIG. 11 shows only an overview of a subset of the components that may be included in the electronic device in some embodiments—for example, telephony-related components that may be included in a smart phone are not illustrated, links to automobile motion generating components are not illustrated, and so on. It is also noted that any of the actions or features described with respect to FIG. 1 through FIG. 10 may be implemented using an electronic device configured as shown in FIG. 11, according to various embodiments.

In the illustrated embodiment, device 3000 includes one or more processors 3010 coupled to a system memory 3020 via an input/output (I/O) interface 3030. Device 3000 further includes a network interface 3040 coupled to I/O interface 3030, and one or more optical devices 3041, sensors 3042, and additional I/O devices 3043. Optical devices 3041 may include, for example, any combination of one or more digital or analog cameras, flashes, photodiode based ambient light sensors, scanners, and/or other optical devices. Sensors 3042 may include, for example, infrared or LIDAR based depth sensors, proximity sensors, motion detectors, orientation sensors, or other types of sensors for detecting various aspects of the electronic device environment. Depth map enhancer 3047 may, for example, include specialized circuitry that implements an efficient optimization algorithm such as Cholesky decomposition in some embodiments. I/O devices 3043 may include, for example, touch pads, touch screens, displays, keyboards, and the like. In some cases, it is contemplated that embodiments may be implemented using a single instance of electronic device 3000, while in other embodiments multiple such devices may be configured to host different portions or instances of embodiments. For example, in one embodiment some of the functionality may be implemented using one instance of an electronic device, while other portions of the functionality may be implemented using other instances of the electronic devices that are distinct from the first instance.

In various embodiments, electronic device 3000 may be a uniprocessor system including one processor 3010, or a multiprocessor system including several processors 3010 (e.g., two, four, eight, or another suitable number). Processors 3010 may be any suitable processor capable of executing instructions. For example, in various embodiments processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA. In some embodiments, graphics processing units (GPUs) may be used, e.g., for parallelizing aspects of the depth map enhancement workflow stages.

System memory 3020 may be configured to store program instructions or code 3025 and/or data 3026 accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions 3025 may be configured to implement one or more analysis and detection modules incorporating any of the functionality described above. Additionally, data 3026 of memory 3020 may include various types of information such as user-specified settings for photography modes, and the like. In some embodiments, program instructions and/or data may be received, sent or stored upon different types of computer-accessible media or on similar media separate from system memory 3020 or electronic device 3000. While electronic device 3000 is described as implementing the functionality of functional blocks of previous figures, any of the functionality described herein may be implemented via such a computer system. In some embodiments, at least a portion of the workflow of depth map enhancement may be implemented by executing instructions 3025 on one or more processors 3010.

In one embodiment, I/O interface 1030 may be configured to coordinate I/O traffic between processor 3010, system memory 3020, and any peripheral devices in the device, including network interface 3040 or other interfaces, such as input/output devices 3041, 3042 or 3043. In some embodiments, I/O interface 3030 may perform any necessary protocol, timing or other data transformations to convert data signals from one component (e.g., system memory 3020) into a format suitable for use by another component (e.g., processor(s) 3010, or depth map enhancer 3047). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between device 3000 and other devices attached to a network 3050 (e.g., carrier or agent devices) or between nodes of electronic device 3000. Network 3050 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 3040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 3043 may, in some embodiments, include one or more display terminals, keyboards, keypads, touchpads, microphones, speakers, voice recognition devices, or any other devices suitable for entering or accessing data by one or more electronic devices 3000. Input/output devices 3041, 3042 or 3043 may be present in electronic device 3000 or may be distributed on various nodes of a multi-node electronic device 3000. In some embodiments, similar input/output devices may be separate from device 3000 and may interact with one or more nodes of device 3000 through a wired or wireless connection, such as over network interface 3040.

As shown in FIG. 11, memory 3020 may include program instructions 3025, which may be processor-executable to implement any element or action described above. In one embodiment, the program instructions may implement the methods described above, such as the methods illustrated by FIG. 7-FIG. 10. In other embodiments, different elements and data may be included. Note that data 3026 may include any data or information described above. In some embodiments, the electronic device 3000 may comprise a general-purpose computer system such as a laptop, desktop, or server computer system.

Those skilled in the art will appreciate that electronic device 3000 is merely illustrative and is not intended to limit the scope of embodiments. In particular, the devices may include any combination of hardware or software that can perform the indicated functions, including computers, network devices, Internet appliances, PDAs, wireless phones, tablets, smart TVs, pagers, etc. Electronic device 3000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated electronic device via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from electronic device 3000 may be transmitted to electronic device 3000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A system, comprising:
   a depth sensor, an image generator; and a depth map enhancer;

wherein the depth map enhancer is configured to:

obtain an initial depth map corresponding to a scene of which a color image is produced by the image generator, wherein the initial depth map is based at least in part on output produced by the depth sensor;

determine, based at least in part on the color image and the initial depth map, initialization settings of a linear optimizer, wherein the initialization settings comprise respective subsets of depth indicators corresponding to a plurality of regions of the color image, including a first depth-information region which satisfies a first criterion, and a second depth-information region;

generate, using the linear optimizer, a first refined depth map corresponding to the scene, wherein the first refined depth map comprises one or more estimated depth indicators corresponding to the second depth-information region; and provide input based at least in part on the first refined depth map to an image processing application.

2. The system as recited in claim 1, wherein to generate the first refined depth map, the linear optimizer performs a Cholesky decomposition operation.

3. The system as recited in claim 1, wherein the color image comprises a plurality of pixels, wherein, prior to determining at least some of the initial settings, the depth map enhancer is configured to:

identify, from the color image, a plurality of super-pixels, wherein an individual super-pixel comprises a plurality of contiguous pixels that meet a homogeneity criterion, wherein the second depth-information region comprises one or more super-pixels, wherein the first refined depth map comprises a respective estimated depth indicator corresponding to individual ones of the one or more super-pixels, and wherein the input provided to the image processing application comprises a pixel-level refined depth map obtained from the first refined depth map.

4. The system as recited in claim 1, wherein the plurality of regions of the color image comprises at least one background region, and wherein, prior to determining at least some of the initial settings, the depth map enhancer is configured to:

generate a mask indicating a portion of the color image corresponding to a predicted primary subject of the color image; and designate, based at least in part on a distance from the mask, a particular region of the color image as a background region.

5. The system as recited in claim 4, wherein to generate the mask, the depth map enhancer utilizes one or more of: (a) a face detector, (b) a machine learning model, or (c) a color propagation algorithm.

6. The system as recited in claim 1, wherein the depth map enhancer is incorporated within one or more of: (a) a phone, (b) a tablet computing device, (c) a laptop computer, (d) a desktop computer, (e) a camera, (f) a wearable computing device, (g) a security monitoring device, (h) a control subsystem of a moving vehicle.

7. The system as recited in claim 1, wherein the depth sensor comprises one or more of: (a) an active stereo sensor, (b) a passive stereo sensor, (c) a time of flight sensor, or (d) an auto-focus sensor.

8. A method, comprising:

performing, by one or more electronic devices:

obtaining an image of a scene, and an initial depth map corresponding to the scene;

determining initialization settings of an optimizer, wherein the initialization settings comprise respective subsets of depth indicators corresponding to a plurality of regions of the image, including a first depth-information region which satisfies a first criterion, and a second depth-information region;

generating a first refined depth map corresponding to the scene, wherein the generating comprises using the optimizer, the image and the initial depth map, and wherein the first refined depth map comprises one or more estimated depth indicators corresponding to at least the second depth-information region identified in the initial depth map, wherein the second depth-information region is identified based at least in part on the first criterion; and providing input based at least in part on the first refined depth map to an image processing application.

9. The method as recited in claim 8, further comprising performing, by the one or more electronic devices:

wherein the initialization settings further comprise respective subsets of depth indicators corresponding to one or more background regions, and one or more depth-information regions which do not satisfy the first criterion, and wherein the second depth-information region does not satisfy the first criterion.

10. The method as recited in claim 9, wherein an objective function of the optimizer comprises an output-to-input similarity term representing a first set of constraints, including a first constraint on a difference between (a) an estimated depth indicator generated for a first group of one or more pixels by the optimizer and (b) a corresponding original depth indicator for the first group, wherein the original depth indicator is included in the initial depth map.

11. The method as recited in claim 9, wherein an objective function of the optimizer comprises a color-similarity-to-depth-similarity-correlation term representing a first set of constraints, including a first constraint on a difference between (a) an estimated depth indicator generated for a first group of one or more pixels by the optimizer and (b) a depth indicator of a second group of one or more pixels, wherein the first group and the second group meet a color similarity criterion.

12. The method as recited in claim 11, further comprising performing, by the one or more electronic devices:

determining an element of a weight matrix associated with the color-similarity-to-depth-similarity-correlation term, based at least in part on a difference in color value between the first and second groups of one or more pixels.

13. The method as recited in claim 9, wherein determining the initialization settings comprises:

generating, based at least in part on a local depth similarity formula, a second depth indicator corresponding to a second group of one or more pixels of the second depth-information region, wherein the local depth similarity formula comprises a first term based on a depth indicator of a first group of one or more pixels of the first depth-information region, wherein the first depth-information region satisfies the first criterion, and wherein the first group lies within a distance threshold of the second group.

14. The method as recited in claim 13, wherein the local depth similarity formula comprises a second term based at least in part in a difference in a color value between the second group and the first group.

15. The method as recited in claim 9, wherein determining the initialization settings comprises:

generating, based at least in part on a global depth similarity formula, a second depth indicator corresponding to a second group of one or more pixels of the second depth-information region, wherein the global depth similarity formula comprises a first term based on a depth indicator of a first group of pixels of a first depth-information region, wherein the first depth-information region satisfies the first criterion, and wherein the first group is selected based on a difference in color values of the second group and the first group.

16. The method as recited in claim 8, wherein an input of the optimizer includes a product matrix, wherein elements of the product matrix can be obtained from a multiplication of a first matrix and a second matrix, the method further comprising performing, by the one or more electronic devices:

determining elements of the product matrix without performing a complete matrix multiplication of the first matrix and the second matrix.

17. An electronic device, comprising:

circuitry implementing a depth map enhancer;

wherein the depth map enhancer is configured to:

obtain (a) an initial depth map corresponding to a scene and (b) an image of the scene;

determine, based at least in part on the image and the initial depth map, initialization settings of a linear optimizer, wherein the initialization settings comprise respective subsets of depth indicators corresponding to a plurality of regions of the image, including a first depth-information region which satisfies a first criterion, and a second depth-information region;

generate a refined depth map corresponding to the scene using the optimizer, the initial depth map and the image, wherein the refined depth map comprises estimated depth indicators corresponding to at least the second depth-information region of the initial depth map, wherein the second inadequate-depth-information region is identified based at least in part on the first criterion; and provide input based at least in part on the first refined depth map to an image processing application.

18. The electronic device as recited in claim 17, wherein the optimizer performs Cholesky decomposition to estimate the depth indicators.

19. The electronic device as recited in claim 17, wherein the depth map enhancer is configured to:

apply a filter to the refined depth map to generate the input provided to the image processing application, wherein the filter comprises one or more of: (a) a bilateral filter or (b) a guided image filter.

20. The electronic device as recited in claim 17, wherein the initial depth map is based at least in part on output obtained from one or more sensors, wherein at least one sensor of the one or more sensors comprises one of: (a) an infrared device or (b) a LIDAR (light detection and ranging) device.

* * * * *